United States Patent [19]

Ogino et al.

[11] Patent Number: 5,061,949
[45] Date of Patent: Oct. 29, 1991

[54] IMAGE FORMING APPARATUS COMPRISING MEANS FOR SETTING A PROPER BIAS VOLTAGE OF LASER EMITTING MEANS AND METHOD THEREFOR

[75] Inventors: Shigeo Ogino, Toyokawa; Masaaki Nishiyama, Toyohashi, both of Japan

[73] Assignee: Minolta Camera Kabushiki Kaisha, Osaka, Japan

[21] Appl. No.: 553,422

[22] Filed: Jul. 17, 1990

[30] Foreign Application Priority Data

Jul. 17, 1989 [JP] Japan .................................. 1-185264

[51] Int. Cl.$^5$ ...................... G01D 15/14; G03G 21/00
[52] U.S. Cl. ..................................... 346/160; 355/246
[58] Field of Search ........................ 346/160; 355/246

[56] References Cited

U.S. PATENT DOCUMENTS

| | | | |
|---|---|---|---|
| 4,647,950 | 3/1987 | Nosaki et al. | 346/160 |
| 4,679,057 | 7/1987 | Hamada | 346/160 X |
| 4,728,989 | 3/1988 | Ohmori . | |
| 4,816,924 | 3/1989 | Sekiya | 346/160 X |
| 4,864,419 | 9/1989 | Saito et al. | 346/160 X |

Primary Examiner—George H. Miller, Jr.
Attorney, Agent, or Firm—Burns, Doane, Swecker & Mathis

[57] ABSTRACT

There is disclosed an image forming apparatus comprising a semiconductor laser diode for emitting a laser light onto a photoconductor so as to form an electrostatic latent image thereon. The electrostatic latent image is developed using toner so as to form a visible toner image on the photoconductor, and there is set a predetermined bias voltage to be supplied to the laser diode. The set bias voltage is applied to the laser diode, and also a driving voltage is applied thereto responsive to image data. When no image data are inputted, the predetermined bias voltage is applied to the laser diode, and a density of a toner image formed on the photoconductor is detected. A controller sets a bias voltage to be applied to the laser diode responsive to the detected density of the toner image.

7 Claims, 7 Drawing Sheets

IMAGE FORMING APPARATUS COMPRISING MEANS FOR SETTING A PROPER BIAS VOLTAGE OF LASER EMITTING MEANS AND METHOD THEREFOR

BACKGROUND OF THE INVENTION

1. Field of the Invention

The present invention relates to an image forming apparatus and a method for forming an image, and more particularly, to an image forming apparatus such as a digital color copy machine comprising means for setting a proper bias voltage of laser emitting means, and a method therefor.

2. Description of the Related Art

A conventional digital color copying machine comprises an image reading section for reading an image of a document (referred to as a document image hereinafter) using a color image sensor and converting the read image into binary print output signal, and a printer section for printing an image on a piece of copying paper in the electrophotographic process responsive to the binary print output signal. In the case of printing an image of plural colors on a piece of copying paper, the reading operation of the image reading section for reading a document image and the printing operation of the printer section for printing an image of each color on the same copying paper are performed sequentially every image of each color.

The above-mentioned printer section amplifies the print output signal inputted from the image reading section and output the amplified print output signal to a laser diode so as to drive it, and a beam of laser light emitted from the laser diode is scanned and projected onto a photoconductive drum so as to form an image thereon. In this case, in order to compensate a change in the emission amount of the laser diode caused due to a change in the temperature, a bias component having a threshold level is overlapped on the image signal. However, even though the image signal is in an off level, the laser diode slightly emits a beam of light (referred to as a bias light hereinafter) responsive to the above-mentioned bias component. As a result, a small amount of toner uniformly adheres onto a reproduced image responsive to the image signal, causing a so-called "fogging" phenomenon. In order to prevent the above-mentioned "fogging" phenomenon, it is disclosed in the U.S. Pat. No. 4,728,989 to provide means for lowering the intensity of a beam of laser light emitted from the laser diode in the transmission path of the laser light.

Also, in order to cut off unnecessary wavelength region component among a beam of laser light emitted from the laser diode in the printer section, it is disclosed in the U.S. Pat. No. 4,679,057 to provide in the transmission path of the laser light an optical filter for cutting off a wavelength region component having a wavelength lower than that of the laser light emitted when a threshold driving current supplied to In order to drive the laser diode at a high speed in the printer section, it is necessary to previously supply a predetermined threshold current as a bias component to the laser diode prior to driving the laser diode. In this case, there is also such a problem that the above-mentioned "fogging" phenomenon is caused due to the bias light, as well as the case of the above-mentioned temperature compensation.

In order to overcome this problem, it is supposed that the light amount of the bias light incident to the photo-conductive drum is lowered by using the above-mentioned means for lowering the light intensity and the above-mentioned optical filter. However, when the light output characteristic of the laser diode changes due to a change in environment such as a change in the temperature, there may be a probability of causing the "fogging" phenomenon again.

SUMMARY OF THE INVENTION

An essential object of the present invention is to provide an image forming apparatus capable of driving a laser emitting means at a high speed and preventing the above-mentioned "fogging" phenomenon or the like even though there is caused a change in the environment such as a change in the temperature.

Another object of the present invention is to provide a method provided in a laser recording apparatus, which is capable of driving a laser emitting means at a high speed and preventing the above-mentioned "fogging" phenomenon or the like even though there is caused a change in the environment such as a change in the temperature.

In order to accomplish these objects, according to one aspect of the present invention, there is provided an image forming apparatus comprising:

a photoconductor;

laser emitting means for emitting a laser light onto said photoconductor so as to form an electrostatic latent image thereon;

developing means for developing said electrostatic latent image formed on said photoconductor using toner so as to form a visible toner image thereon;

bias voltage setting means for setting a predetermined bias voltage to be applied to said laser emitting means;

laser driving means for applying said predetermined bias voltage set by said bias voltage setting means to said laser emitting means and for applying a driving voltage to said laser emitting means responsive to image data;

detection means for enabling said developing means in such a state that no image data are inputted to said laser driving means and said predetermined bias voltage is applied to said laser emitting means and for detecting a density of a toner image formed on said photoconductor; and control means for setting a bias voltage to be applied to said laser emitting means responsive to said density of the toner image detected by said detection means.

According to another aspect of the present invention, there is provided an image forming apparatus comprising:

laser emitting means for supplying a driving current corresponding to inputted image signal so as to emit a laser light;

optical means for projecting said laser light emitted from said laser emitting means so as to form an electrostatic latent image on a photoconductor;

developing means for developing said electrostatic latent image formed on said photoconductor using toner so as to form a visible toner image thereon;

detection means for detecting a density of said visible toner image formed on said photoconductor; and adjustment means for detecting said density of the toner image formed on said photoconductor when said image signal is in an off level and for controlling said driving current responsive to said density detected by said detection means.

According to a further aspect of the present invention, in a laser recording apparatus for supplying a driving current corresponding to image data to a laser emitting device to which a predetermined bias voltage is applied so as to emit a beam of laser light, and projecting the beam of laser light onto a photoconductor so as to form an image on said photoconductor, there is provided a method for said laser recording apparatus comprising the following steps:

electrically charging said photoconductor;

applying a predetermined bias voltage to said laser emitting device without supplying said driving current thereto;

developing an electrostatic latent image formed on said photoconductor using toner so as to form a toner image thereon;

detecting a toner amount of said toner image formed on said photoconductor; and controlling said bias voltage responsive to said detected toner amount.

According to a still further aspect of the present invention, in an image forming apparatus for supplying a driving current corresponding to inputted image data to a semiconductor laser so as to emit a beam of laser light, projecting the beam of laser light onto a photoconductor so as to form an electrostatic latent image on said photoconductor, and developing said electrostatic latent image using toner so as to form a visible toner image on said photoconductor, there is provided a method for said image forming apparatus comprising the following steps:

supplying a predetermined driving current to said semiconductor laser in such a state that said image signal is in an off level;

making toner adhere to said photoconductor;

detecting a toner density of said toner adhering onto said photoconductor; and controlling said driving current responsive to said detected toner density.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

A digital color copying machine of a preferred embodiment according to the present invention will be described below in detail in an order of the following items with reference to the attached drawings.

Figure 1:
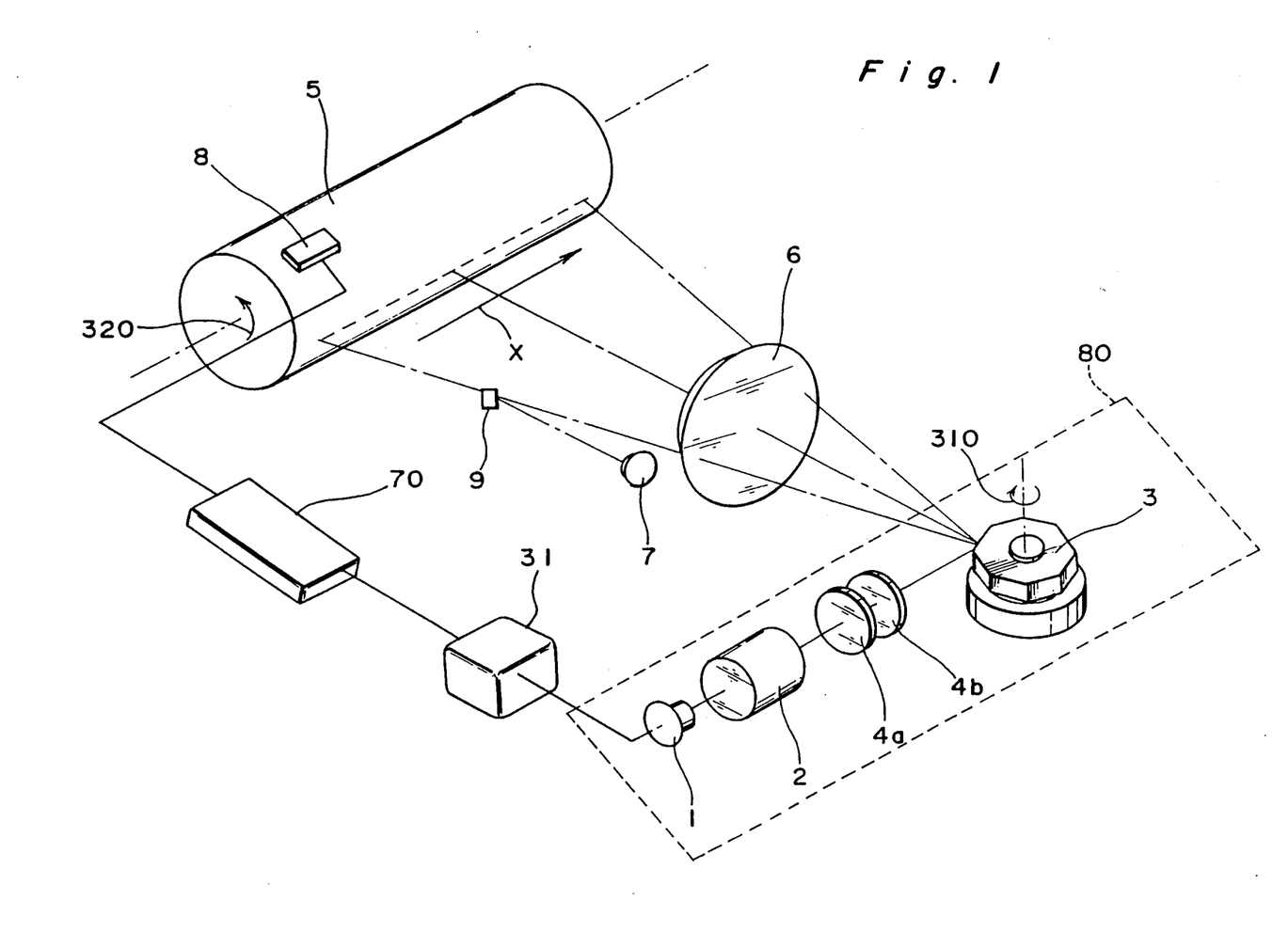
FIG. 1 is a schematic perspective view showing an optical system of a digital color copying machine of a preferred embodiment according to the present invention.
Figure 2:
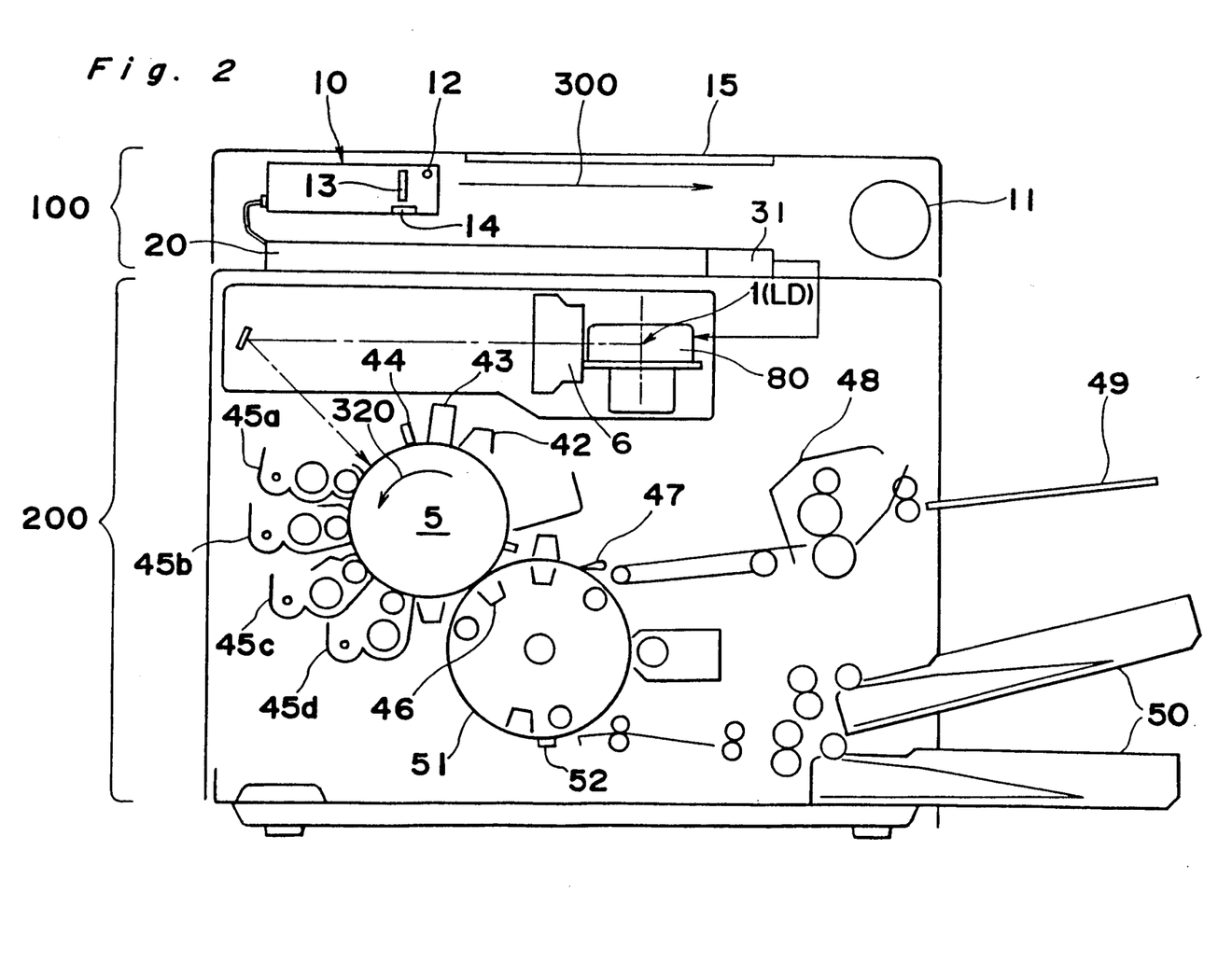
FIG. 2 is a schematic cross sectional view showing a composition of the digital color copying machine shown in FIG. 1.
Figure 4:
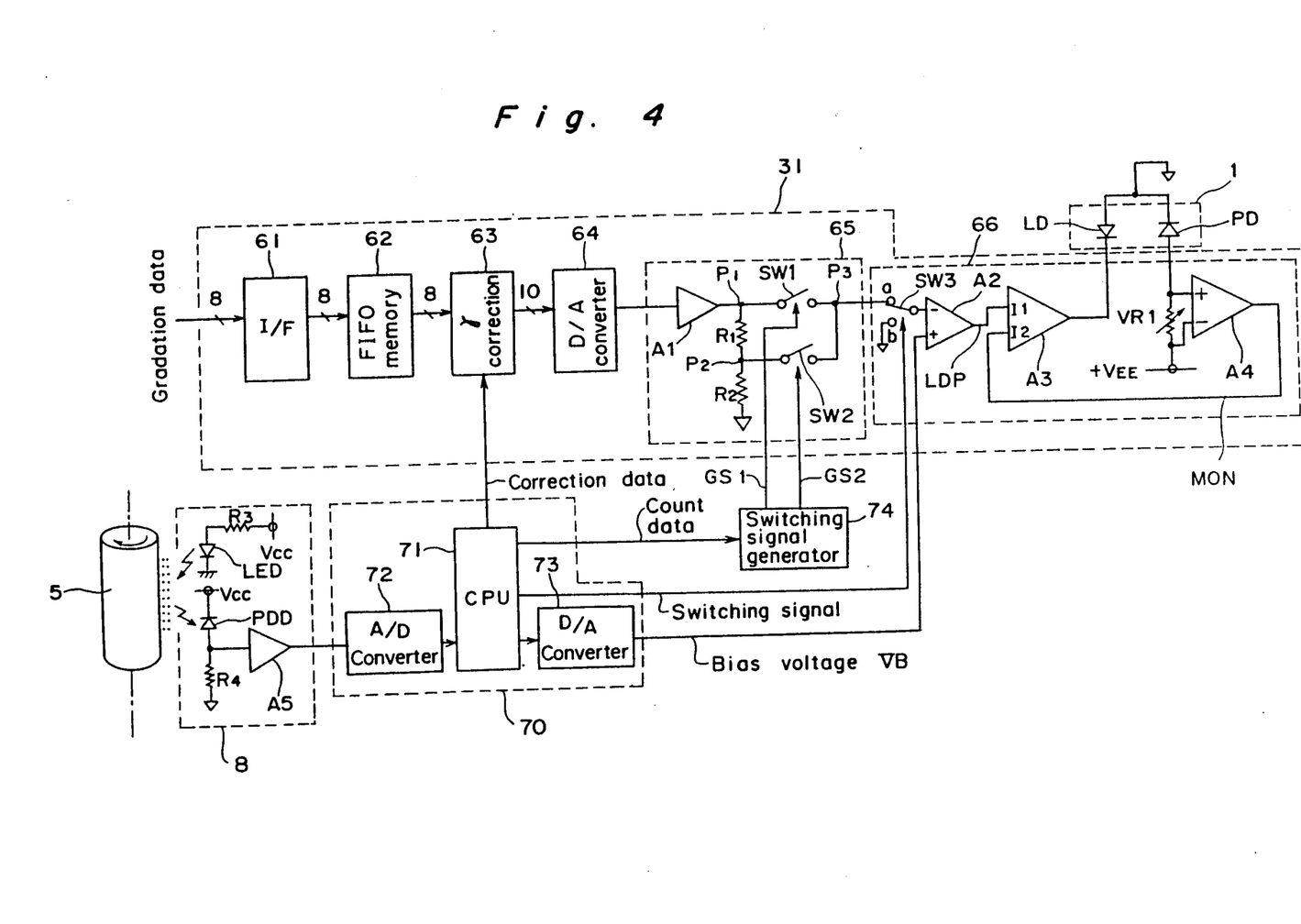
FIG. 4 is a schematic block diagram showing detailed compositions of a print head, a controller and a detection unit for detecting a toner amount.

[I] Composition of Digital color copying machine
[II] Processing section for read image signals
[III] Print head, Controller and detection unit for detecting toner amount
[IV] Action of Digital color copying machine [I] Composition of Digital color copying machine As shown in FIGS. 1, 2 and 4, the digital color copying machine of the preferred embodiment according to the present invention comprises an image reading section 100 for reading a document image using a CCD color image sensor 14 and converting the read document image into gradation data, and a printer section 200 for converting the gradation data into driving signals for driving a laser diode LD of a semiconductor laser 1 and printing an image on a piece of copying paper in the electrophotographic process responsive to the driving signals. The digital color copying machine is characterized in that there are provided in the transmission path of the laser light emitted from the laser diode LD, an ND filter 4a for attenuating the laser light, and an optical band-pass filter 4b for passing therethrough the oscillation wavelength component of the laser diode LD and the wavelength component positioned in the vicinity of the oscillation wavelength, and also, there is provided in the vicinity of the photoconductive drum 5 of the printer section 200, a detection unit 8 for detecting the density of the toner image formed on the photoconductive drum 5.

It is to be noted that, in the digital color copying machine, in the case of printing a document image of plural colors on a piece of copying paper, the reading operation of the image reading section 100 for reading a document image and the printing operation of the printer section 200 for printing an image of each color on the same copying paper are performed sequentially every image of each color.

FIG. 2 is a schematic cross sectional view showing the digital color copying machine of the preferred embodiment according to the present invention, and FIG. 1 is a schematic cross sectional view showing a composition of an optical system of the digital color copying machine shown in FIG. 2.

Referring to FIG. 2, a scanner 10 comprises an exposure lamp 12 for illuminating a document, a rod-lens array 13 for collecting the light reflected from the document, and a CCD color image sensor 14 of contact type for converting the collected light into electric signals. The scanner 10 is driven by a motor 11 so as to move in a direction (a subscan direction) indicated by an arrow 300 upon reading a document set on a platen 15. The image of the document illuminated by the exposure lamp 12 is converted photoelectrically by the image sensor 14. Multi-valued electric signals of three colors R (red), G (green) and B (blue) outputted by the image sensor 14 are converted into gradation data of 8 bits regarding either of yellow (Y), magenta (M), cyan (C) and black (K) by a processing section 20 for the read image signals. Thereafter, a print head 31 performs a γ-correction for the inputted gradation data according to properties of each toner to be used in the digital color copying machine, and then, generates a driving signal for the laser diode LD by converting the corrected image data to digital gradation data so as to drive the laser diode LD provided in a semiconductor laser 1.

As shown in FIG. 1, a laser beam scan optical system 80 comprises the semiconductor laser 1, a collimator lens 2, the ND filter 4a for attenuating the laser light by a predetermined light amount, the optical band-pass filter 4b, and a polygon mirror 3.

Referring to FIG. 1, a beam of laser light emitted from the laser diode LD of the semiconductor laser 1 responsive to the gradation data is projected onto a deflection surface of the polygon mirror 3 through the collimator lens 2, the ND lens 4a and the optical band-pass filter 4b. A beam of laser light projected onto the deflection surface of the polygon mirror 3 is deflected according to the rotation thereof in a direction indicated by an arrow 310 or a clockwise direction in FIG. 1, namely, a beam of laser light is scanned in a main scan direction indicated by an arrow X, and is projected through an fθ lens 6 onto the photoconductive drum 5 which is rotated in a rotation direction indicated by an arrow 320 so that the surface of the photoconductive drum 5 is exposed thereto. Then, the document image is formed on the surface of the photoconductive drum 5.

At that time, upon the start of the scan in the main scan direction, a beam of laser light is reflected by a reflection mirror 9, and is incident onto a detection unit 7 for detecting a start of scan signal (referred to as an SOS signal hereinafter). Responsive to the beam of laser light, the detection unit 7 outputs an SOS signal which is a synchronizing signal representing a start of one scan line in the main scan direction upon forming an image thereon. Further, there is provided in the vicinity of the surface of the photoconductive drum 5, the detection unit 8 for detecting the density of the toner image formed on the photoconductive drum 5. A detection signal outputted from the detection unit 8 is inputted to a controller 70, which determines the most proper bias current to be supplied to the laser diode LD of the semiconductor laser 1 responsive to the detection signal.

Referring to FIG. 2, the photoconductive drum 5 is illuminated by an eraser lamp 42, electrically charged by a corona charger 43 and illuminated by a suberaser lamp 44 prior to the exposure on every printing operation. When the surface of the photoconductive drum 5 is exposed to the beam of laser light in such a state that it is electrically charged uniformly, an electrostatic latent image is formed on the photoconductive drum 5. The latent image formed on the photoconductive drum 5 is developed using toner contained in a developing unit selected among yellow, magenta, cyan and black developing units 45a to 45d so as to form a visible toner image thereon. The developed visible toner image is transferred onto a piece of copying paper wound around a transfer drum 51 by a transfer charger 46.

The printing operation is repeated with respect to colors of yellow, magenta, cyan and black. The scanner 10 repeats the scan operation in synchronous with actions of the photoconductive drum 5 and the transfer drum 51. Thereafter, the copying paper is separated from the transfer drum 51 by operating a separation nail 47, passes through a fixing unit 48 so that the toner image is fixed on the copying paper, and is discharged onto a discharge tray 49.

It is to be noted that the copying paper is fed from a paper feeding cassette 50 containing copying papers, and the top end of a piece of copying paper is chucked by a chucking mechanism 52 provided on the transfer drum 51 in order to prevent the copy paper from shifting upon transferring a toner image thereon.

[II] Processing section for read image signals

The processing section 20 for outputting gradation data by processing output signals from the CCD color image sensor 14 is described with reference to FIG. 3.

Figure 3:
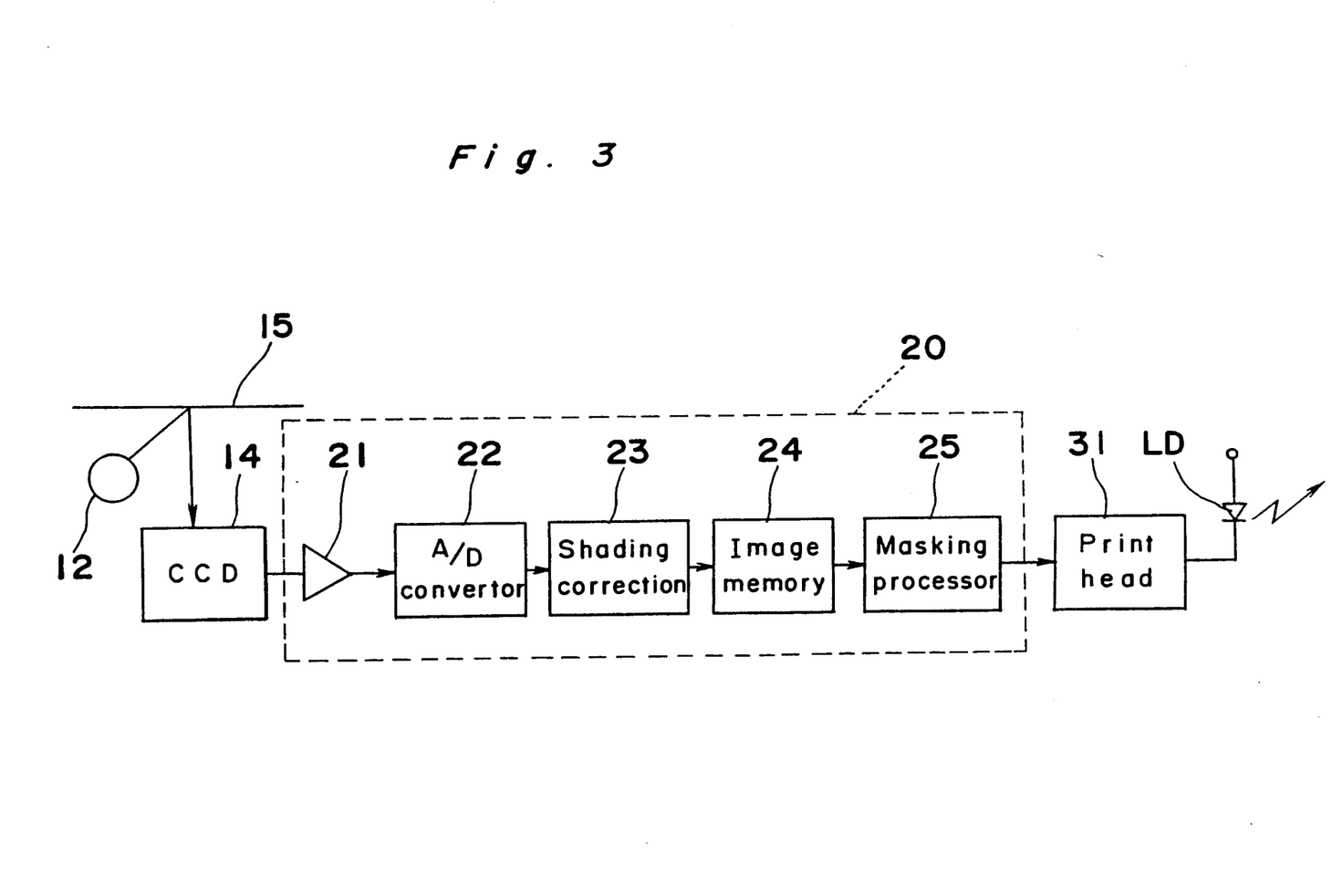
FIG. 3 is a block diagram showing a composition of a processing section for read image signals.

Referring to FIG. 3, image signals outputted from the CCD color sensor 14 are converted to image density data by a logarithm amplifier 21, and then, the image density data are converted to multi-valued digital image data of R, G and B by an analog to digital converter 22. These R, G and B image data are respectively subjected to a predetermined shading correction by a shading correction circuit 23, and then, are stored in an image memory 24. The above-mentioned processes are performed in parallel with respect to three colors R, G and B.

Thereafter, a masking processing circuit 25 generates gradation data with respect to each color of yellow, magenta, cyan and black based upon image data of three colors R, G and B stored in the image memory 24, and outputs them to the print head 31 in order to print an image of plural colors on a piece of copying paper in each color successively.

As described below in detail, the print head 31 performs a γ-correction corresponding to the developing toner property of the copying machine for the inputted gradation data, generates a driving signal for the laser diode LD by a digital to analog conversion with respect to the corrected image data, and drives the laser diode LD of the semiconductor laser 1 by the driving signal.

The sequential processings from reading the image data from the image memory 24 to printing by driving the laser diode LD are performed with respect to each color in the order of yellow, magenta, cyan and black, and thereby, printing a full color image on a piece of copying paper.

In order to synchronize in the horizontal direction, the image reading by the CCD color image sensor 14 with the image data processings by respective circuits of the processing section 20 and the print head 31, a horizontal synchronizing signal and a clock signal are generated in a manner similar to that which is well known to those skilled in the art. The image data of R, G and B from the CCD color sensor 14 are processed serially in synchronous with the clock signal, and the line in the main scan direction is renewed every time the horizontal synchronizing signal is generated, and the scanner 10 moves by a unit distance in the subscan direction upon renewal of the line.

[III] Print head, Controller and Detection unit for detecting toner amount

FIG. 4 is a schematic block diagram showing detailed compositions of the print head 31, the controller 70 and the detection unit 8 for detecting the toner amount of a toner image.

Referring to FIG. 4, gradation data of 8 bits outputted from the masking circuit 25 of the processing section 20 are inputted to a first-in first-out memory (referred to as an FIFO memory hereinafter) 62 through an interface circuit 61 for performing interface processings such as a signal conversion processing. The FIFO memory 62 is a line buffer memory capable of storing gradation data of a predetermined number of lines in the main scan direction, and is provided because the operation clock frequency of the image reading section 100 is different from that of the print head 31.

A γ-correction circuit 63 includes a correction table comprised of a ROM which stores data of plural γ-correction curves for correcting the γ-characteristic which is the characteristic of the toner density of a toner image to be printed on a piece of copying paper so as to become linear. The correction circuit 63 converts the gradation data inputted from the FIFO memory 62 into corrected gradation data of 10 bits, based on data of one γ-correction curve selected according to correction data inputted from a CPU 71, and outputs them to a gain switching circuit 65 through a digital to analog converter 64.

In the gain switching circuit 65, a gradation analog signal inputted from the digital to analog converter 64 is inputted through an amplifier A1 to a connection point P1. The gradation analog signal amplified by the amplifier A1 is outputted through a switch SW1 and a connection point P3 to a laser diode controller 66 as a driving signal, and the voltage of the signal inputted to the connection point P1 is divided by resistances R1 and R2. Then, the voltage induced across the resistance R2 or the voltage induced between a connection point P2 connecting the resistances R1 and R2 and the ground is outputted through a switch SW2 and a connection point P3 to the laser diode controller 66 as the driving signal.

The switches SW1 and SW2 are turned ON or OFF according to switching signals GS1 and GS2 inputted from a switching signal generation circuit 74, respectively, which generates the switching signals GS1 and GS2 based on count data inputted from the CPU 71. The switching signal GS2 is an inversion signal of the switching signal GS1. When the switching signal GS1 is in a high level and the switching signal GS2 is in a low level, the switch SW1 is turned ON and the switch SW2 is turned OFF. At that time, the gradation analog signal inputted from the digital to analog converter 64 is amplified by the amplifier A1, and then, the amplified signal is outputted to the laser diode controller 66 through the switch SW1. On the other hand, when respective switching signals GS1 and GS2 are inverted from the above-mentioned state, the switch SW1 is turned OFF and the switch SW2 is turned ON. At that time, after the voltage of the gradation analog signal amplified by the amplifier A1 is divided with an attenuation ratio $L = R2/(R1+R2)$ by the resistances R1 and R2, the voltage induced across the resistance R2 is outputted through the switch SW2 to the laser diode controller 66. Accordingly, the gain switching circuit 65 switches, according to the switching signals GS1 and GS2, whether the voltage of the gradation analog signal outputted from the amplifier A1 is outputted thereto as it is, or the voltage induced across the resistance R2 by the voltage division with the above-mentioned attenuation ratio is outputted thereto, thereby changing the γcharacteristic which is the printing input and output characteristic of the electrophotographic process.

In the laser diode controller 66, the voltage of the driving signal inputted from the gain switching circuit 65 is inputted to an inversion input terminal of an amplifier A2 for an offset adjustment through an a-side of a switch SW3 which is controlled by the CPU 71 of the controller 70. On the other hand, a bias voltage VB outputted from the CPU 71 through a digital to analog converter 73 is inputted to a non-inversion input terminal of the amplifier A2. The b-side of the switch SW3 is electrically connected to the ground, and when the switch SW3 is turned over to the b-side thereof, zero voltage is inputted to the non-inversion input terminal of the amplifier A2. The output LDP of the amplifier A2 is inputted to a first input terminal of an amplifier A3 for driving the laser diode LD, and the output of the amplifier A3 drives the laser diode LD of the semiconductor laser 1.

In the semiconductor laser 1, there are provided not only the laser diode LD but also a photodiode PD for detecting the output of the laser diode LD. The output of the photodiode PD is inputted to a non-inversion input terminal of an amplifier A4 for feedback control, and an inversion input terminal of the amplifier A4 is electrically connected to a negative direct-current voltage source $V_{EE}$. Further, a variable resistance VR1 for adjusting the driving current to be supplied to the laser diode LD so as to become the maximum thereof is electrically connected between the inversion input terminal and the non-inversion input terminal of the amplifier A4. The output of the amplifier A4 is inputted as a feedback voltage signal MON to a second input terminal of the amplifier A3. As a result, a feedback control system is constituted, the light output power of the laser diode LD is controlled so that the driving signal voltage LDP outputted from the amplifier A2 becomes equal to the feedback voltage signal MON.

As shown in FIG. 4, the detection unit 8 for detecting the density of the toner image formed on the surface of the photoconductive drum 5 comprises a light emitting diode LED, a photodiode PDD, and an amplifier A5. The light emitted from the light emitting diode LED is reflected by the toner image formed on the surface of the photoconductive drum 5, and then, the reflected light is incident onto the photodiode PDD, which outputs a detection signal to the CPU 71 of the controller 70 through the amplifier A5 and an analog to digital converter 72 of the controller 70. The signal level of the detection signal outputted from the photodiode PDD is approximately in inverse proportion to the density of the toner image formed on the surface of the photoconductive drum 5. The CPU 71 of the controller 70 calculates the density of the toner image based on the inputted detection signal, and executes the setting process for setting the most proper driving bias current to be supplied to the laser diode LD of the semiconductor laser 1, as described in detail later.

[IV] Action of Digital color copying machine

Figure 5:
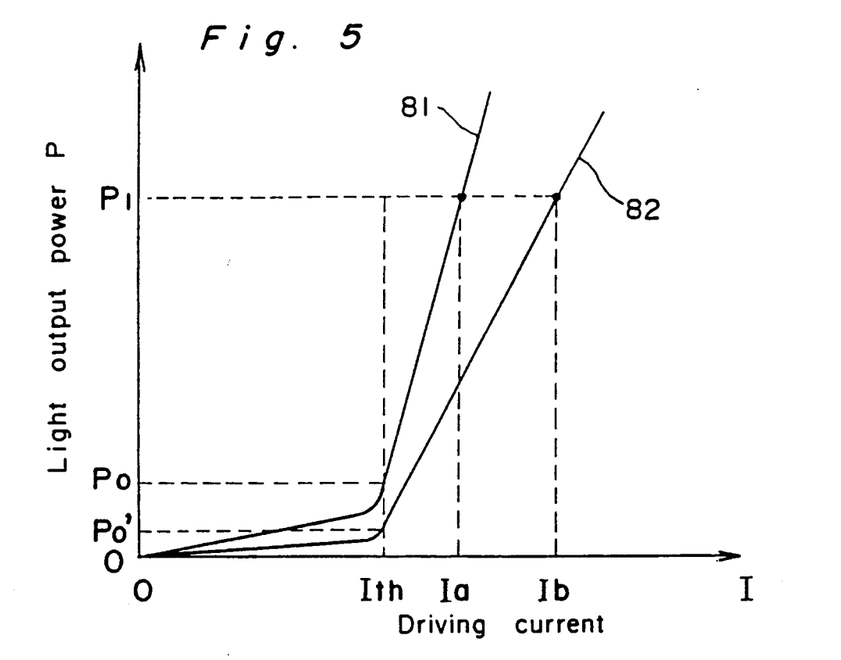
FIG. 5 is a graph showing a light output power characteristic on a driving current to be supplied to a laser diode.

FIG. 5 is a graph showing the light output power on the driving current to be supplied to the laser diode LD.

In FIG. 5, a characteristic curve 81 denotes a light output characteristic of a conventional copying machine. As is apparent from the characteristic curve 81, a predetermined threshold current Ith is supplied thereto in order to drive the laser diode LD at a high speed, and the light output power $P_o$ is always outputted even though the image signal is in an off level. Then, as described above, the light output power $P_o$ induces the above-mentioned bias light, causing the "fogging" phenomenon or the like.

In the preferred embodiment, as shown in FIGS. 1 and 2, the ND filter 4a is inserted in the transmission path of the laser light so that the light power of the laser light reaching the photoconductive drum 5 is lowered as shown in a characteristic curve 82 of FIG. 5. At that time, the light output power P when the image signal is in an off level is lowered from $P_o$ to $P_o'$, and then, the density of the toner image formed in the "fogging" phenomenon can be lowered to a level so that the "fogging" phenomenon can be hardly seen by the human eyes.

Figure 6:
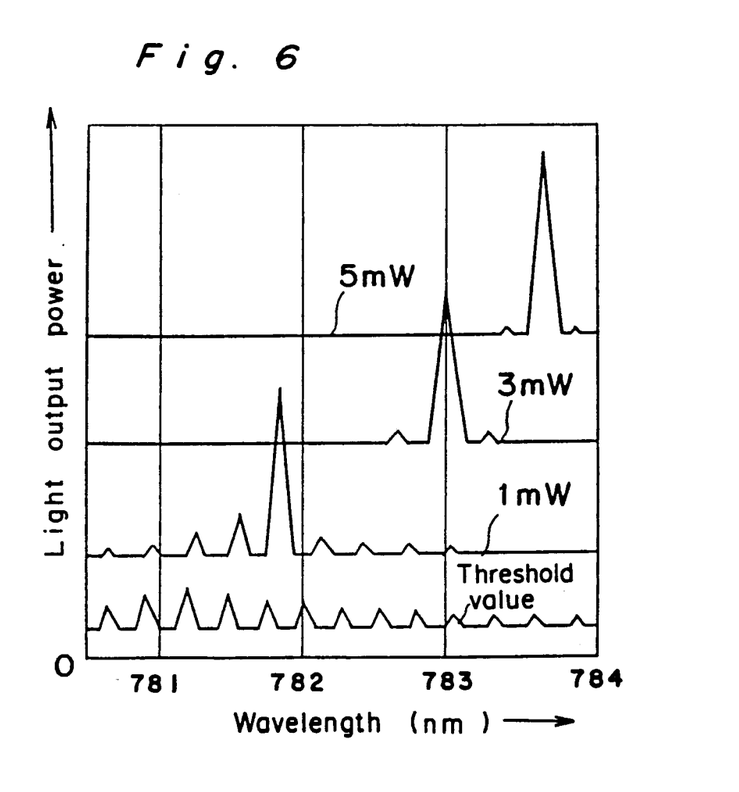
FIG. 6 is a graph showing an oscillation spectrum characteristic of the laser diode.

FIG. 6 shows an oscillation spectrum of the laser diode LD of the semiconductor laser 1. In FIG. 6, there is shown the oscillation spectrum within a range of the light output power used in a conventional copying machine of intensity modulation type, namely, in the range from the light output power when the laser diode LD is always driven by a predetermined threshold driving current in order to drive the laser diode LD at a high speed, to a light output power of 5 mW when the signal level of the image signal is the maximum thereof.

In a conventional copying machine, since the predetermined threshold driving current is supplied to the laser diode LD, the laser light in a multi mode having plural peaks as shown in FIG. 6 is projected onto the photoconductive drum 5, and then, there is caused the "fogging" phenomenon.

Figure 7:
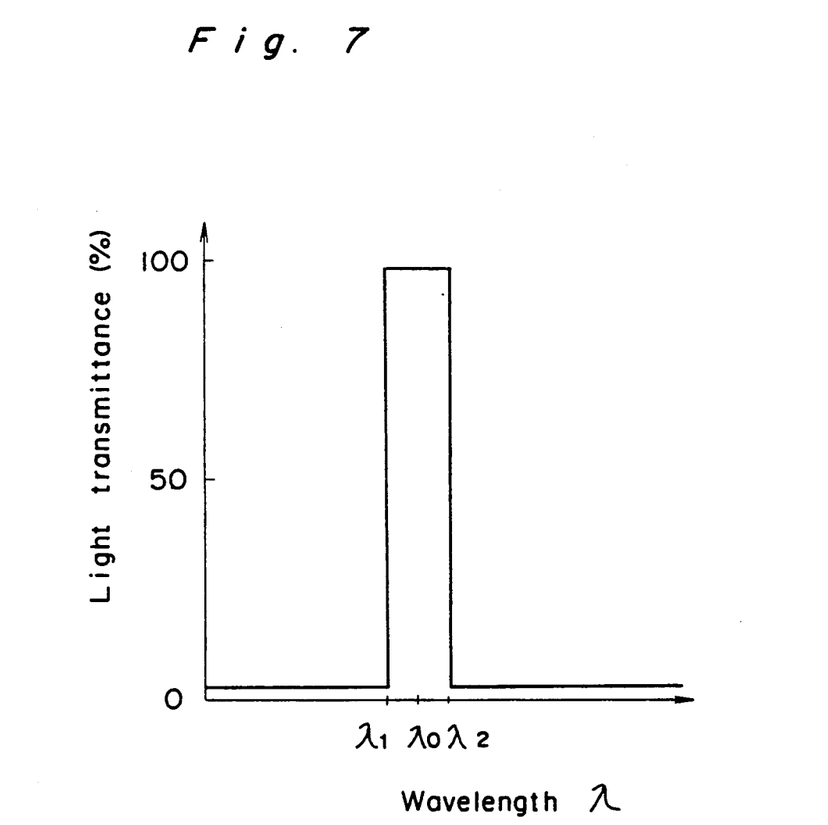
FIG. 7 is a graph showing a light transmittance characteristic of an optical band-pass filter.

On the other hand, in the preferred embodiment, as shown in FIGS. 1 and 2, the optical band-pass filter 4b is inserted in the transmission path of the laser light. FIG. 7 shows a light transmittance characteristic of the optical band-pass filter 4b on the wavelength, and the band-pass filter 4b has a pass-band in a range from a wavelength $\lambda_1$ through a center wavelength $\lambda_0$ to a wavelength $\lambda_2$, wherein the wavelengths $\lambda_1$ and $\lambda_2$ are positioned in the vicinity of the center wavelength $\lambda_0$. Therefore, when the optical band-pass filter 4b is inserted therein, the oscillation wavelength component of the laser diode LD passes therethrough, however, components having unnecessary wavelengths other than the oscillation wavelength can be cut off, substantially. Then, the light output power induced by the predetermined threshold driving current can be substantially lowered so as to prevent the above-mentioned "fogging" phenomenon, resulting in such an advantage that the intensity modulation can be performed more faithfully.

When the ND filter 4a and the optical band-pass filter 4b are inserted in the transmission path of the laser light, the laser diode LD can be driven at a high speed, and the above-mentioned "fogging" phenomenon or the like can be prevented. However, when the light output characteristic of the laser diode LD changes due to a change in the environment such as a change in the temperature, there may be a possibility of causing the "fogging" phenomenon or the like. In order to always prevent the "fogging" phenomenon, the following setting process for setting the most proper bias driving current to be supplied to the laser diode LD is executed in the present preferred embodiment.

Figure 8:
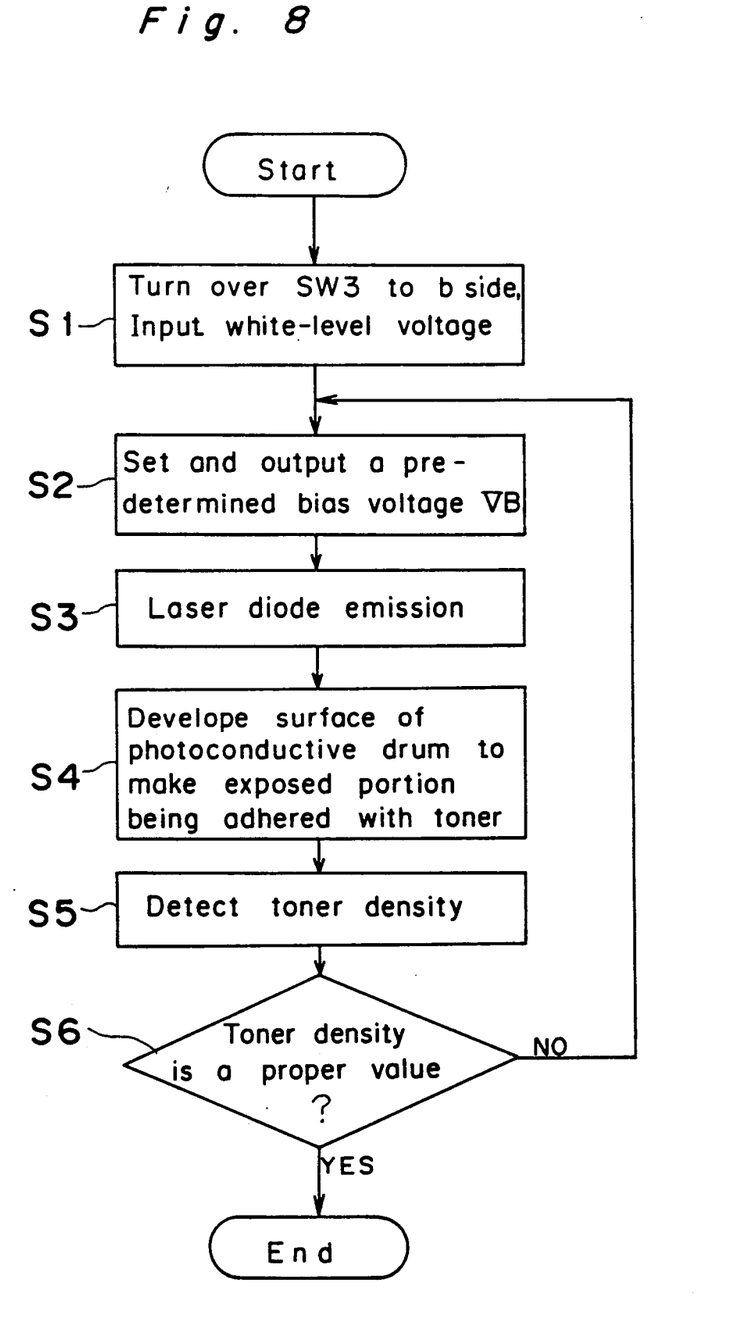
FIG. 8 is a flowchart showing a control process for setting the most proper driving bias current to be supplied to the laser diode.

FIG. 8 is a flowchart showing the setting process for setting the most proper bias driving current of the laser diode LD, which is executed by the CPU 71 of the controller 70. The control action of the CPU 71 will be described below with reference to FIGS. 8 and 4.

The setting process shown in FIG. 8 is started when a main switch (not shown) of the digital color copying machine is turned on, or every time the copying process for a predetermined copies is executed, etc..

Referring to FIG. 8, at step S1, the CPU 71 outputs a switching signal to the switch SW3 so that the switch SW3 is turned over to the b-side thereof. Then, zero voltage is applied to the inversion input terminal of the amplifier A2, and there is set gradation data of zero, namely, there is set such a state that no image is formed responsive to the image signal.

Thereafter, at step S2, the CPU 71 outputs a predetermined bias voltage VB to the non-inversion input terminal of the amplifier A2 through the digital to analog converter 73. Thereafter, at step S3, the bias driving current is supplied to the laser diode LD by the above-mentioned bias voltage, and then, the laser diode LD emits the laser light at step S3 so that the surface of the photoconductive drum 5 is exposed thereto at a predetermined timing, resulting in an electrostatic latent image thereon. Further, at step S4, the surface of the photoconductive drum 5 is developed, namely, the electrostatic latent image is developed using toner so as to form a visible toner image thereon.

Thereafter, at step S5, the density of the toner image formed on the exposed portion of the surface of the photoconductive drum 5 is detected by the detection unit 8 for detecting the toner amount, and then, the detection signal outputted from the detection unit 8 is inputted through the analog to digital converter 72 of the controller 70 to the CPU 71 thereof.

Thereafter, at step S6, the CPU 71 calculates the density of the toner image from the inputted detection signal, and judges whether or not the calculated density is a proper value whose toner image can not be seen by the human eyes, namely, the calculated density is a proper value which is smaller than a permittable maximum density in which any "fogging" phenomenon is not caused. If the calculated density of the toner image is a proper value (Yes at step S6), there is set the bias voltage VB set at the previous step S2 as it is, and then, the setting process is completed. On the other hand, if the calculated density of the tone image is not a proper value (No at step S6), the program flow goes to step S2, the bias voltage VB is altered to another value and the altered value is set at the bias voltage VB, and then, the above-mentioned processes from step S2 to step S6 are repeated until the calculated density of toner image becomes a proper value.

By the above-mentioned control process, when the image signal is in an off level, namely, the gradation data is set at zero, there can be obtained the most proper bias voltage VB when the density of the toner image formed on the photoconductive drum 5 becomes a proper value which is smaller than the permittable maximum density in which there is not caused any "fogging" phenomenon or the like. Thereafter, when the obtained bias voltage VB is applied to the non-inversion input terminal of the amplifier A2, the most proper bias driving current can be supplied to the laser diode LD of the semiconductor laser 1, and there can be realized a copying operation without any "fogging" phenomenon or the like.

Further, by repeating the above-mentioned control process, even though the light output characteristic of the laser diode LD changes due to a change in the environment such as a change in the temperature, the most proper bias driving current can be supplied to the laser diode LD, and the "fogging" phenomenon or the like can be always prevented. Further, the laser diode LD can be driven at a high speed.

As described above, in the present preferred embodiment, there can be set a bias driving current in which any "fogging" phenomenon or the like is not caused by inserting the ND filter 4a and the optical band-pass filter 4b in the transmission path of the laser light. In addition to this, by executing the setting process for setting the most proper bias driving current, even though the light output characteristic of the laser diode LD changes due to a change in the environment such as a change in the temperature, the "fogging" phenomenon or the like can be always prevented, and the laser diode LD can be driven at a high speed.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image forming apparatus comprising:
   a photoconductor;
   laser emitting means for emitting a laser light onto said photoconductor so as to form an electrostatic latent image thereon;
   developing means for developing said electrostatic latent image formed on said photoconductor using toner so as to form a visible toner image thereon;
   bias voltage setting means for setting a predetermined bias voltage to be applied to said laser emitting means;
   laser driving means for applying said predetermined bias voltage set by said bias voltage setting means to said laser emitting means and for applying a driving voltage to said laser emitting means responsive to image data;
   detection means for enabling said developing means in such a state that no image data are inputted to said laser driving means and said predetermined bias voltage is applied to said laser emitting means and for detecting a density of a toner image formed on said photoconductor; and
   control means for setting a bias voltage to be applied to said laser emitting means responsive to said density of the toner image detected by said detection means.

2. The apparatus as claimed in claim 1, further comprising optical filter means for cutting off a portion of the laser light emitted from said laser emitting means, said optical filter means being arranged between said laser emitting means and said photoconductor.

3. The apparatus as claimed in claim 1, further comprising:
   image data supply means for supplying image data; and
   switching means for selectively inputting image data supplied from said image data supply means to said laser driving means, said switching means being arranged between said image data supply means and said laser driving means.

4. An image forming apparatus comprising:
   laser emitting means for supplying a driving current corresponding to inputted image signal so as to emit a laser light;
   optical means for projecting said laser light emitted from said laser emitting means so as to form an electrostatic latent image on a photoconductor;
   developing means for developing said electrostatic latent image formed on said photoconductor using toner so as to form a visible toner image thereon;
   detection means for detecting a density of said visible toner image formed on said photoconductor; and
   adjustment means for detecting said density of the toner image formed on said photoconductor when said image signal is in an off level and for controlling said driving current responsive to said density detected by said detection means.

5. In a laser recording apparatus for supplying a driving current corresponding to image data to a laser emitting device to which a predetermined bias voltage is applied so as to emit a beam of laser light, and projecting the beam of laser light onto a photoconductor so as to form an image on said photoconductor,
   a method for said laser recording apparatus comprising the following steps:
   electrically charging said photoconductor;
   applying a predetermined bias voltage to said laser emitting device without supplying said driving current thereto;
   developing an electrostatic latent image formed on said photoconductor using toner so as to form a toner image thereon;
   detecting a toner amount of said toner image formed on said photoconductor; and
   controlling said bias voltage responsive to said detected toner amount.

6. The method as claimed in claim 5,
   wherein said bias voltage is lowered when said toner amount of said toner image formed on said photoconductor is larger than a predetermined value, and said bias voltage is heightened when said toner amount of said toner image formed on said photoconductor is smaller than said predetermined value.

7. In an image forming apparatus for supplying a driving current corresponding to inputted image data to a semiconductor laser so as to emit a beam of laser light, projecting the beam of laser light onto a photoconductor so as to form an electrostatic latent image on said photoconductor, and developing said electrostatic latent image using toner so as to form a visible toner image on said photoconductor,
   a method for said image forming apparatus comprising the following steps:
   supplying a predetermined driving current to said semiconductor laser in such a state that said image signal is in an off level;
   making toner adhere to said photoconductor;
   detecting a toner density of said toner adhering onto said photoconductor; and
   controlling said driving current responsive to said detected toner density.

* * * * *